United States Patent [19]

Harker

[11] Patent Number: 5,489,178
[45] Date of Patent: Feb. 6, 1996

[54] METHOD AND APPARATUS FOR IMPROVED MASONRY DRIVE ANCHOR

[76] Inventor: Brian G. Harker, 15565 Durham Way, Granger, Ind. 46530

[21] Appl. No.: 163,288

[22] Filed: Dec. 8, 1993

[51] Int. Cl.$^6$ ............................ F16B 15/00; F16B 15/08
[52] U.S. Cl. ................... 411/451; 411/446; 411/456
[58] Field of Search .................... 411/446, 447, 411/451, 456, 508, 439

[56] References Cited

U.S. PATENT DOCUMENTS

| | | | |
|---|---|---|---|
| 372,844 | 11/1887 | Emerson et al. | 411/451 X |
| 1,574,790 | 3/1926 | Carroll . | |
| 4,828,445 | 5/1989 | Giannuzzi | 411/451 |
| 4,936,062 | 10/1990 | Giannuzzi | 411/451 X |
| 5,035,559 | 7/1991 | Nilsen | 411/456 X |
| 5,069,588 | 12/1991 | Hasan et al. | 411/451 X |
| 5,265,998 | 11/1993 | Kluser | 411/451 X |

FOREIGN PATENT DOCUMENTS 55-122918  9/1980  Japan .

OTHER PUBLICATIONS

Reported Court Decision, 23 U.S.P.Q. 2d 1054 (S.D.N.Y. 1992).

*Primary Examiner*—Neill R. Wilson
*Attorney, Agent, or Firm*—Ryan M. Fountain

[57] ABSTRACT

An anchor bolt is provided having a shank which is retained within a recess via peak to peak reaction forces rather than a plurality of peak to base arrangements. This is accomplished through the use of one or more continuous "S" bends or undulations intermediate the shank ends. The "S" bends each create two peaks which extend outwardly from the shank surface with a continuous curve therebetween. That curve includes an inflection point, preferably on the longitudinal axis of the shank, but the slope of the curve at the inflection point is not parallel to that longitudinal axis. Thus, when the shank is inserted within the recess compressive pressure applied to one such peak is directly opposed by such forces applied to the other peak. These peaks can be disposed on opposite sides of the shank or, for example, disposed in a helical or other such pattern about three or more sides of the shank. Serration and/or an abrasive surface can also be provided on the shank to increase retention.

12 Claims, 2 Drawing Sheets

1

METHOD AND APPARATUS FOR IMPROVED MASONRY DRIVE ANCHOR

BACKGROUND AND SUMMARY OF THE INVENTION

The present invention relates generally to fasteners for holding an object against a surface via an interference fit between the fastener and a recess in that surface. More particularly, the present invention relates to pound-in anchor bolts for use in masonry.

This invention is an improvement upon products made by Rawlplug Co., Inc. as well as those made by Illinois Tool Works, Inc. Those products of Rawlplug are described in U.S. Pat. Nos. 4,828,445 and 4,963,062. The full disclosure of these prior patents is specifically incorporated herein by reference, and the reader is directed to review those references initially to obtain background and contextual information. Similarly, the products of Illinois Tool Works (ITW) are described by comparison in the reported decision of Rawlplug Co., Inc. v. Illinois Tool Works Inc., 23 U.S.P.Q. 2d 1054 (S.D.N.Y. 1992). That decision is likewise specifically incorporated by reference herein for background and contextual information.

Briefly, the Rawlplug anchors are characterized by a shank having an intermediate peak with separate opposing bases while the ITW anchors are characterized by an offset of the shank itself at an intermediate location to create peaks with integral bases for the opposing peaks. However, neither of these types of anchors nor other such anchors currently on the market have proven to be entirely satisfactory. Ideally, minimal involvement or distortion of the anchor head and shank orientation would result during installation so that the head when being struck, does not cant off of the recess centerline and, thus, can lie flat against the object or surface when fully installed. Also, the spacial requirements of the anchor should be minimized to reduce materials cost and the necessary masonry penetration depth. At the same time, however, retention pressure should be maximized so as to prevent undesired removal of the anchor from the recess. Further, it is desirable to reduce manufacturing costs as much as possible.

Accordingly, the present invention provides an anchor bolt having a shank which is retained within a recess via peak to peak reaction forces rather than a plurality of peak to base arrangements. This is accomplished through the use of one or more continuous "S" bends or undulations intermediate the shank ends. The "S" bends each create two peaks which extend outwardly from the shank surface with a continuous curve therebetween. That curve includes an inflection point, preferably on the longitudinal axis of the shank, but the slope of the curve at the inflection point is not parallel to that longitudinal axis. Thus, when the shank is inserted within the recess, compressive pressure applied to one such peak is directly opposed by such forces applied to the other peak. These peaks can be disposed on opposite sides of the shank or, for example, disposed in a helical or other such pattern about three or more sides of the shank. Serrations and/or an abrasive surface can also be provided on the shank to increase retention.

Other objects, advantages and novel features of the present invention will become readily apparent from consideration also of the drawings and detailed description below.

DETAILED DESCRIPTION OF PREFERRED EMBODIMENTS

Figure 1:
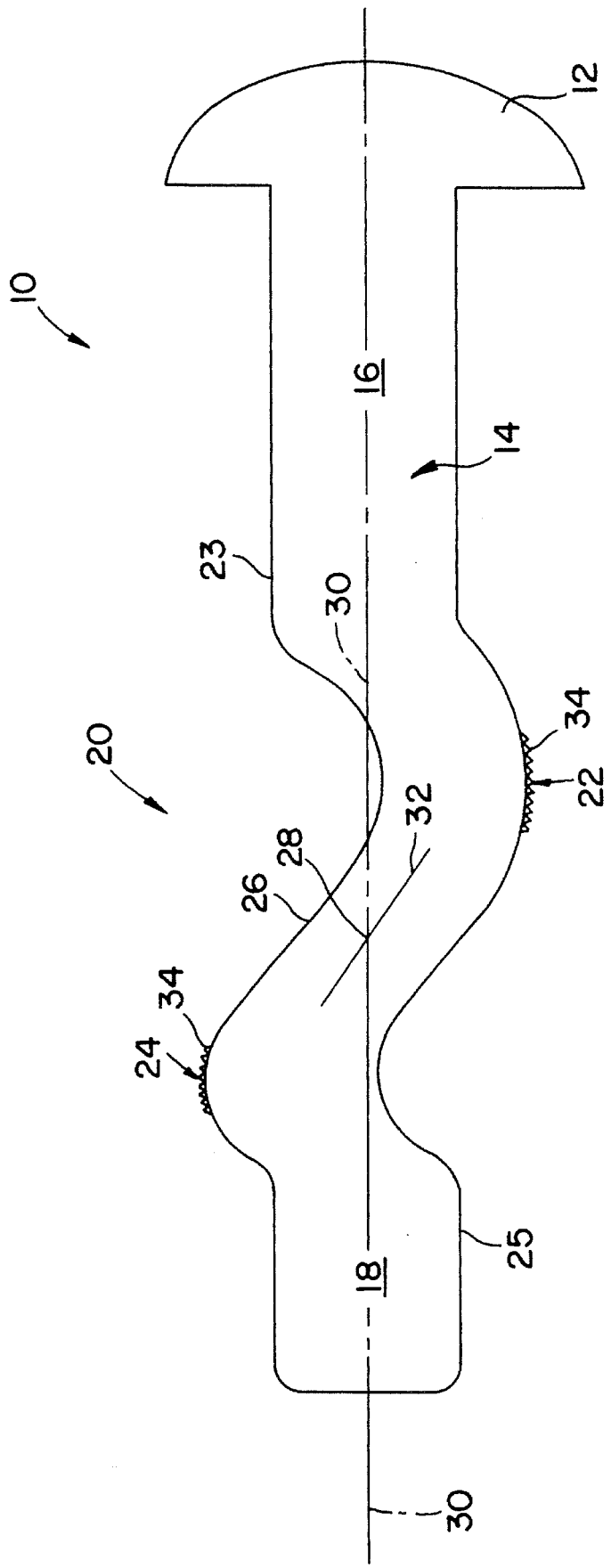
FIG. 1 shows a side view of an anchor bolt incorporating the present invention.
Figure 2:
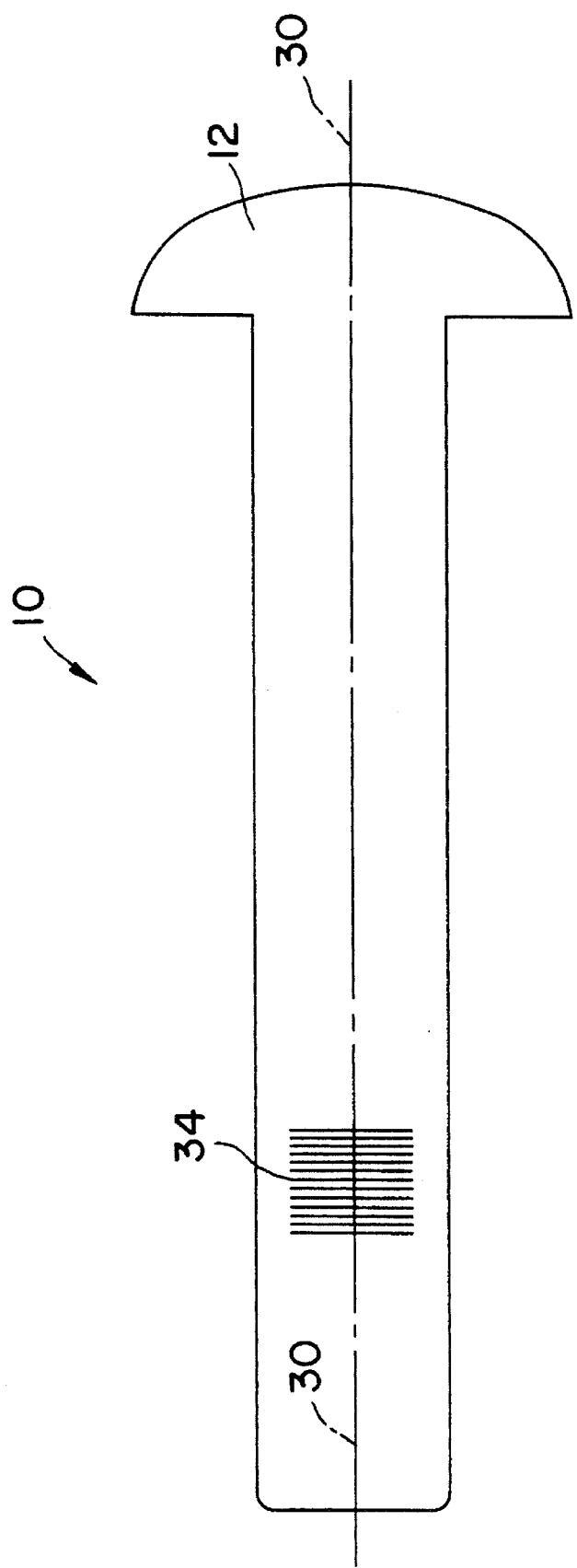
FIG. 2 shows a top view of the anchor bolt of FIG. 1.

FIG. 1, which illustrates a preferred embodiment of the present invention, shows an anchor bolt 10 of the type for insertion into a recess or hole in a masonry surface or structure. Anchor 10 includes a head 12 adapted to receiving striking blows for pounding the anchor into a recess. Head 12, for example, is sufficiently enlarged with respect to other portions of anchor 10 so as to retain objects to the anchor when disposed on the masonry surface. Alternative embodiments would include use of different head configurations, such as a threaded end for receiving a nut or tie-wire receptacle. Preferably, head 12 is formed so as to seat flush against the surface or object when the anchor is fully mounted in a recess. Anchor 10 also includes a shank 14 extending from head 12. As a general matter, shank 14 is adapted to be received within a recess and retained therein via an interference fit.

Shank 14 includes an upper portion 16 adjacent head 12, a lower portion 18 at the free end of the shank, and intermediate portion 20 providing a retention structure for maintaining the interference fit. In the illustrated example, this retention structure includes an "S" shaped bend or undulation which creates two peaks 22 and 24 with a continuous curve portion 26 between those peaks. Shank 14 is preferably formed initially as a substantially uniform body, such as a right cylinder extending along longitudinal axis 30. Intermediate portion 20 can, for example, be formed by striking shank 14 from opposing sides with forming tools at closely spaced locations along axis 30. Thus, upper portion 16 and lower portion 18 remain as uniform cylindrical shapes along axis 30.

At the same time, however, peaks 22 and 24 are preformed to be raised with respect to the cylindrical surfaces of portions 16 and 18 and extend further in a radially outward direction from axis 30. Continuous curve portion 26 includes an inflection point 28 in the transition of curvature between peaks 22 and 24. Preferably, this inflection point occurs along axis 30. However, the slope 32 of curvature 26 at the inflection point is, for example, inclined with respect to axis 30 rather than parallel to it. Thus, there is no base portion in shank 14 between peaks 22 and 24. Base portions 23 and 25, corresponding to peaks 22 and 24, respectively, are included on opposite sides of shank 14 for also supporting against compressive forces. However, this placement of peaks and base portions serves to minimize distortion of shank 14, and the base portions preferably maintain a longitudinal axis coincident with axis 30.

Alternative preferred embodiments include formation of Serrations 34 on peaks 22 and 24 to aid in gripping the interior surface of the recess into which shank 14 is inserted. Further, the material selected for shank 14, a resilient metal or plastic material, for example, can include an abrasive surface texture for a similar purpose and to aid in user manipulation during installation. Also peaks may be formed at three or more locations on shank 14, as, for example, following a helix about the surface circumference. In that case each slope of the continuous curve at the inflection point between each pair of peaks defines, with respect to axis 30, a plane, and none of those planes are parallel to each other.

As a result of the arrangement described above, when anchor bolt 10 is in place within the recess the forces exerted on peaks 22 and 24 by the wall of the recess, tending to compress those peaks toward axis 30, are directed in reaction against each other along slope 32, rather than against an intermediate base or to distort another portion of shank 14. Thus, each peak is urged into tighter engagement with the recess. At the same time, elimination of a base structure between the peaks provides a more compact structure to permit use of shorter shanks and shallower recesses. It has further been found that shank manufacturing costs can be reduced by the present invention.

Although the present invention has been described above in detail, the same is by way of illustration and example only and not to be taken as a limitation. Those skilled in the art will now recognize that various alternatives can be used with this invention, including for example, forming shank 14 as a noncylindrical shape. Accordingly, the spirit and scope of the present invention are limited only by the terms of the claims below.

What is claimed is:

1. An anchor bolt for insertion within and retention by a preformed hole, comprising:

a shank extending along a first longitudinal axis and being dimensioned so as to be received within said hole via an interference fit, said shank being formed from material sufficiently compressible to permit insertion of said shank within said hole, two pre-formed peaks disposed on said shank and longitudinally offset from each other, said peaks being formed in paired relation to each other, base portions corresponding with each of said peaks and located on opposing regions of said shank from each peak with the longitudinal axis of said base portions coinciding with said first longitudinal axis, and means formed on said shank for directing reaction forces applied to said peaks, during utilization of said anchor, along a common line of force between said peaks of the pair, said line of force intersecting said first longitudinal axis.

2. The anchor bolt according to claim 1 wherein said peaks are formed from undulations intermediate the ends of said shank and said means for directing reaction forces arises from formation of said peaks as a continuous bend in said shank with an inflection point on said first longitudinal axis with the slope of the shank at that inflection point being non-parallel to said first longitudinal axis.

3. The anchor bolt according to claim 2 wherein said shank is formed from resilient metal materials and includes serration across a portion of its length for abrasively engaging the surface of the body in which the anchor is inserted.

4. The anchor bolt according to claim 2 wherein three or more of such peaks are formed on said shank with such a common line of force being established between each pair of said peaks and defining a plane with respect to said first longitudinal axis, but none of said planes being parallel as respects each pair of peaks.

5. An apparatus for retaining an element to a surface having a pre-formed recess in said surface for receiving a portion of said apparatus and retaining that portion via an interference fit, comprising:

a generally cylindrical shank extending at each end along a first longitudinal axis and adapted to be received within said recess;

an enlarged head portion formed at one end of said shank;

a free end portion formed on said shank at an end opposite said head portion;

a plurality of pre-formed undulations formed on said shank intermediate said head and free end portions;

said undulations forming at least one pair of peaks elevated from the cylindrical surface of said shank, those peaks being spaced apart along said first longitudinal axis; and the portion of said shank between said pair of peaks being formed as a continuous curve and having an inflection point along that curve with the slope of the shank at said inflection point being nonparallel to said first longitudinal axis such that upon insertion of said shank into said recess compresslye forces are exerted on each of said peaks within that pair which directly oppose each other so as to maintain a tight interference fit within said recess and minimize distortion of said apparatus beyond said peaks.

6. The apparatus according to claim 5 wherein said shank is formed from a resilient material having an abrasive surface texture.

7. A fastener adapted to be pounded into a pre-formed surface recess to retain an object to said surface by an interference fit of said fastener within said recess, comprising:

a head portion, an upper shank portion connected to said head portion and formed as a substantially uniform body extending along a longitudinal axis, an S-shaped bend portion connected to said upper shank portion and formed with at least two pre-formed peaks in paired relation extending radially outwardly with respect to the surface of said upper shank portion and a continuous curve portion between said peaks having therein an inflection point in the curvature of said bend portion, the slope of the surface of said continuous curve portion at said inflection point being non-parallel to said longitudinal axis, and a lower shank portion connected to said bend portion and formed as a substantially uniform body extending along said longitudinal axis.

8. The fastener according to claim 7 wherein said substantially uniform body is a right cylinder.

9. The fastener according to claim 8 wherein said bend portion is formed by offset striking of a tool against a uniform cylindrical shank intermediate its ends.

10. An anchor bolt system for retaining an object to a masonry surface, comprising:

a pre-formed hole in said masonry surface, said hole having an interior surface, a resilient anchor bolt adapted to be driven into said hole and to be retained therein via an interference fit with said interior surface, said bolt having a head portion which remains outside of said hole and a shank portion which is inserted into said hole and engages said interior surface, said shank portion including an upper portion adjacent to said head portion and a lower portion at the free end of said shank, said upper and lower portions each being formed as a right cylinder extending along a longitudinal axis and each thereby having a cylindrical surface at a substantially uniform radius from said axis, said shank portion including two adjacent, preformed peak portions in paired relation intermediate said upper and lower portions, said peak portions each being raised with respect to said cylindrical surface such that the peak portions extend radially outward from said axis further than said cylindrical surface, said peak portions being adjacent such that the length of said shank therebetween includes no surface extending parallel to said cylindrical surface, and said peak portions having a radial distance therebetween of sufficient length that said interior surface exerts force on said peak portions to compress those peak portions toward said axis when said bolt is inserted into said hole, that compression force being exerted on one of those peak portions being directed directly against the compressire force on the other of said paired peak portions.

11. The anchor bolt system according to claim 10 wherein said peak portions are disposed about said shank such that a line the line segment drawn between the radially outermost section of each peak portion is non-parallel with said longitudinal axis.

12. The anchor bolt system according to claim 11 wherein said peak portions are disposed on opposing sides of said shank.

* * * * *